US010324569B2

(12) United States Patent
Kim et al.

(10) Patent No.: US 10,324,569 B2
(45) Date of Patent: Jun. 18, 2019

(54) TOUCH SENSING UNIT, TOUCH SCREEN PANEL HAVING THE SAME, AND METHOD OF DRIVING THE TOUCH SCREEN PANEL

(71) Applicant: Samsung Display Co., Ltd., Yongin-si (KR)

(72) Inventors: Yun Ho Kim, Yongin-si (KR); Ja Seung Ku, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 114 days.

(21) Appl. No.: 15/153,303

(22) Filed: May 12, 2016

(65) Prior Publication Data

US 2017/0108965 A1 Apr. 20, 2017

(30) Foreign Application Priority Data

Oct. 15, 2015 (KR) .......................... 10-2015-0144013

(51) Int. Cl.
*G06F 3/044* (2006.01)
(52) U.S. Cl.
CPC .... *G06F 3/044* (2013.01); *G06F 2203/04101* (2013.01); *G06F 2203/04111* (2013.01)
(58) Field of Classification Search
USPC ............................................... 345/173–174
See application file for complete search history.

(56) References Cited

U.S. PATENT DOCUMENTS

| 7,663,607 | B2 | 2/2010 | Hotelling et al. |
| 8,274,488 | B2 | 9/2012 | Bae |
| 2004/0018654 | A1* | 1/2004 | Drost .................. G06F 17/5077 438/17 |
| 2011/0025639 | A1 | 2/2011 | Trend et al. |
| 2011/0279397 | A1 | 11/2011 | Rimon et al. |
| 2013/0181942 | A1* | 7/2013 | Bulea ...................... G06F 3/044 345/174 |
| 2014/0253495 | A1 | 9/2014 | Kang et al. |
| 2015/0109243 | A1* | 4/2015 | Jun ......................... G06F 3/044 345/174 |

* cited by examiner

*Primary Examiner* — Aneeta Yodichkas
*Assistant Examiner* — Deeprose Subedi
(74) *Attorney, Agent, or Firm* — H.C. Park & Associates, PLC

(57) ABSTRACT

A touch screen panel and a driving method thereof. The touch screen panel includes a touch pad unit including a plurality of receiver pads and a plurality of transmitter pads combined with the receiver pads, and a touch sensing unit for determining a touch position, based on changes in mutual capacitance between the receiver pads and the transmitter pads. The touch sensing unit determines maximum values for every column by scanning touch sensing signals in the column direction of the touch pad unit, decides whether rows having maximum values for every column are the same, when the rows having the maximum values for every column are not the same, determines a greatest value by comparing all values of the scanned touch sensing signals, and determines touch coordinates through a combination of transmitter and receiver pads corresponding to the position at which the greatest value exists.

6 Claims, 6 Drawing Sheets

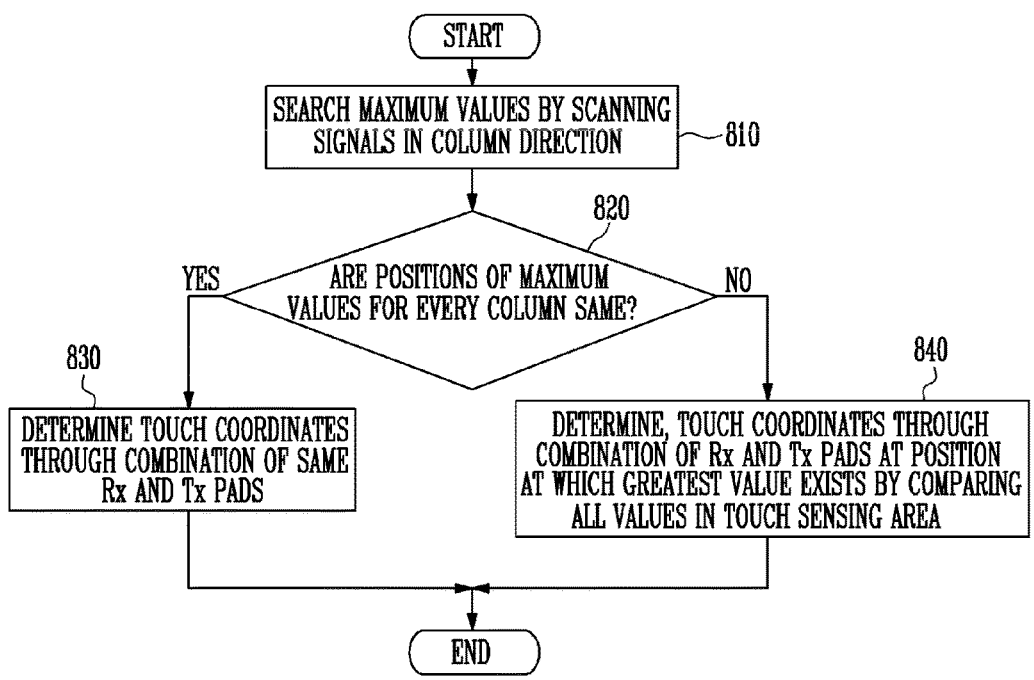

TOUCH SENSING UNIT, TOUCH SCREEN PANEL HAVING THE SAME, AND METHOD OF DRIVING THE TOUCH SCREEN PANEL

CROSS-REFERENCE TO RELATED APPLICATION

This application claims priority from and the benefit of Korean Patent Application No. 10-2015-0144013, filed on Oct. 15, 2015, which is hereby incorporated by reference for all purposes as if fully set forth herein.

BACKGROUND

Field

Exemplary embodiments relate to a touch sensing unit, a touch screen panel having the touch sensing unit, and a method of driving the touch screen panel.

Discussion of the Background

Display devices are required for computer monitors, televisions, mobile phones, and the like, which are currently in wide use. The display devices for displaying images by using digital data include a cathode ray tube display device, a liquid crystal display (LCD), a plasma display panel (PDP), an organic light emitting display, and the like. As the display devices become higher in resolution and larger in area, the transmission amount of data increases, and the transmission speed of data increases.

A touch screen panel is an input device that allows a user's instruction to be input by selecting an instruction content displayed on a screen of an image display device or the like with a user's hand or object.

To this end, the touch screen panel is formed on a front face of the image display device to convert, into an electrical signal, a contact position at which the user's hand or object is in direct contacted with the touch screen panel. Accordingly, the instruction content selected at the contact position is inputted as an input signal to the image display device. Such a touch screen panel can replace a separate input device, such as a keyboard or a mouse, connected to an image display device, and hence, its application fields have been gradually extended.

There are various methods of implementing touch screen panels, including a resistive layer method, an optical sensing method, and an electrostatic capacitance method. In the electrostatic capacitance method, multi-touch recognition can be implemented through a self-capacitance method and a mutual capacitance method. This utilizes a principle such that, when a pointer such as a person's finger is contacted with a surface of a touch screen panel, a position of the contact is recognized by detecting a change in the capacitance formed in a sensing cell (node) located on the contact surface, which is caused by the electric field of a human body.

The electrostatic capacitance method has higher durability and definition than the resistive layer method, and can carry out multi-touch recognition and proximity-touch recognition. Thus, the electrostatic capacitance method can be utilized in a wide range of various applications. For example, in the electrostatic capacitance method, a touch may be sensed by applying a touch driving signal to transmitter pads (Tx pads) coupled to transmitter lines (Tx lines), and then sensing a charge amount generated by a change in voltage of receiver pads (Rx pads) connected to receiver lines (Rx lines) by using mutual capacitance formed between the Rx pads and the Tx pads.

However, a touch reaction may be generated by coupling between Rx pads within a touch position and lines of Tx pads corresponding thereto. That is, a position other than an actual touch position may be erroneously recognized as the touch position, and therefore, accuracy in recognizing a touch position may be reduced as a result of a ghost phenomenon.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a method and a device for accurately sensing a touch position.

Exemplary embodiments also provide a method and a device for sensing an actual touch position by distinguishing an actual touch signal from a ghost signal in a touch panel having a 1-layer mutual structure.

Additional aspects will be set forth in the detailed description which follows, and, in part, will be apparent from the disclosure, or may be learned by practice of the inventive concept.

An exemplary embodiment discloses a touch screen panel, including: a touch pad unit including a plurality of receiver pads and a plurality of transmitter pads combined with the receiver pads; and a touch sensing unit configured to determine a touch position, based on changes in mutual capacitance between the receiver pads and the transmitter pads. The touch sensing unit is configured to: determine maximum values for every column by scanning touch sensing signals in the column direction of the touch pad unit; decide whether rows having maximum values for every column are the same; when the rows having the maximum values for every column are not the same, determine a greatest value by comparing all values of the scanned touch sensing signals; and determine touch coordinates through a combination of transmitter and receiver pads corresponding to the position at which the greatest value exists.

An exemplary embodiment also discloses a method of driving a touch screen panel, the method comprising: determining maximum values for every column by scanning touch sensing signals in the column direction of a touch pad unit; deciding whether rows having maximum values for every column are the same; when the rows having the maximum values for every column are not the same, determining a greatest value by comparing all values of the scanned touch sensing signals; and determining touch coordinates through a combination of transmitter and receiver pads corresponding to the position at which the greatest value exists.

An exemplary embodiment also discloses a touch sensing unit configured to determine maximum values for every column by scanning touch sensing signals in the column direction of a touch pad unit; decide whether rows having maximum values for every column are the same; when the rows having the maximum values for every column are not the same, determine a greatest value by comparing all values of the scanned touch sensing signals; and determine touch coordinates through a combination of transmitter and receiver pads corresponding to the position at which the greatest value exists.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 7 is a diagram illustrating an example of a touch sensing signal corresponding to a touch event according to an exemplary embodiment of the present disclosure.

FIG. 8 is a flowchart illustrating an example of a method for determining a touch position according to an exemplary embodiment of the present disclosure.

DETAILED DESCRIPTION OF THE ILLUSTRATED EMBODIMENTS

Figure 1:
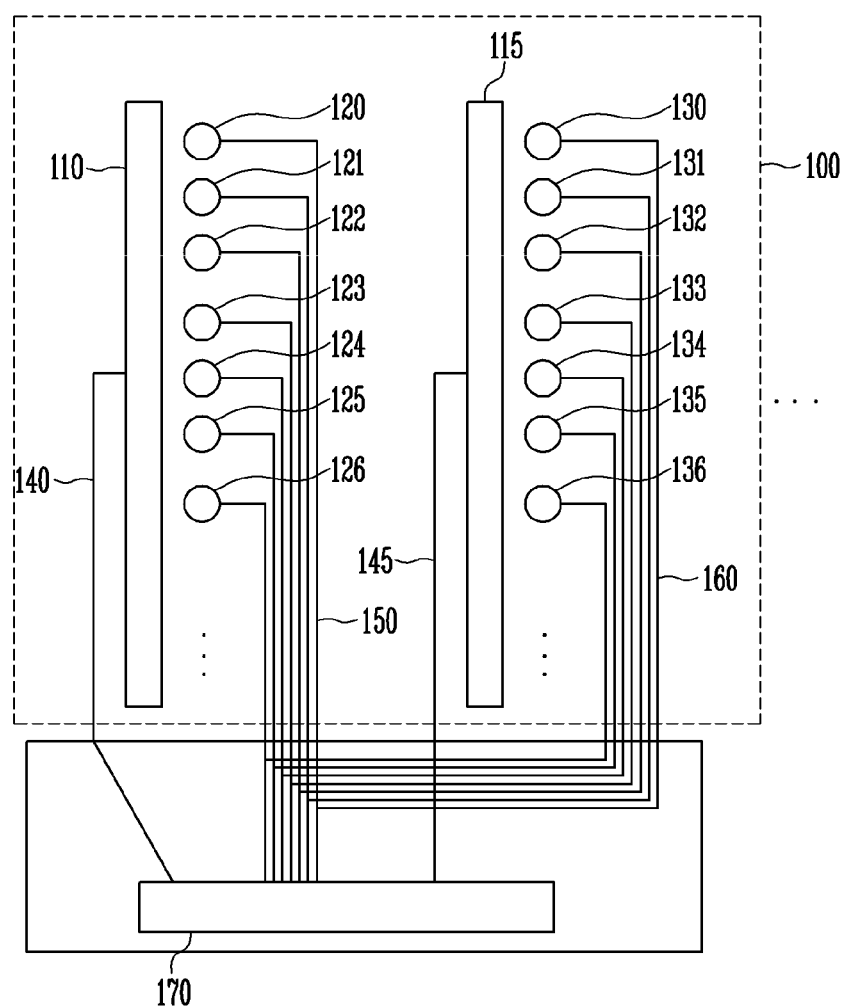
FIG. 1 is a diagram illustrating an exemplary embodiment of a configuration of transmitter pads and receiver pads in a touch screen panel.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. The regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a diagram illustrating an exemplary embodiment of a configuration of transmitter pads and receiver pads in a touch screen panel.

Referring to FIG. 1, the touch screen panel (TSP) may include a touch pad unit 100 including a plurality of receiver pads (Rx pads) 110 and 115, and a plurality of transmitter pads (Tx pads) 120, 121, 122, 123, 124, 125, 126, 130, 131, 132, 133, 134, 135, and 136 corresponding thereto. In the following description, the terms "receiver electrode," "receiver pad," "Rx electrode," "Rx pad," "Rx cell," "Rx pattern cell," "Rx IC pad," and the like may be used together. Also, the terms "transmitter electrode," "transmitter pad," "Tx electrode," "Tx pad," "Tx cell," "Tx pattern cell," "Tx IC pad," and the like may be used together.

In this case, as shown in FIG. 1, any one of the Tx pads 120, 121, 122, 123, 124, 125, 126, 130, 131, 132, 133, 134, 135, and 136 may be adjacent to another Tx pad in the column direction (y-axis direction). For example, in a first column of the TSP, a (1-1)th Tx pad 120 may be adjacent to a (1-2)th Tx pad 121 in the column direction (y-axis direction), and the (1-2)th Tx pad 121 may be adjacent to the (1-1)th Tx pad 120 and a (1-3)th Tx pad 122 in the column direction (y-axis direction). Also, any one of the Tx pads 120, 121, 122, 123, 124, 125, 126, 130, 131, 132, 133, 134, 135, and 136 may be adjacent to the Rx pad 110 or 115) in the row direction (x-axis direction). For example, the (1-1)th Tx pad 120 may be adjacent to a first Rx pad 110 in the row direction (x-axis direction). In addition, at least one of the Tx pads 120, 121, 122, 123, 124, 125, 126, 130, 131, 132, 133, 134, 135, and 136 may correspond to one Rx pad 110 or 115 to be adjacent to each other in the row direction (x-axis direction). That is, a plurality of Tx pads 120, 121, 122, 123, 124, 125, and 126, or 130, 131, 132, 133, 134, 135, and 136 adjacent to each other in the column direction (y-axis direction) may be arranged adjacent to one Rx pad 110 or 115 in the row direction (x-axis direction). For example, in the first column of the TSP, n (n is an integer of 1 or more) (1-1)th to (1-n) Tx pads 120, 121, 122, 123, 124, 125, and 126 adjacent to each other in the column direction (y-axis direction) may be arranged adjacent to the first Rx pad 110 in the row direction (x-axis direction). FIG. 1 illustrates that the Rx pads 110 and 115 and the Tx pads 120, 121, 122, 123, 124, 125, 126, 130, 131, 132, 133, 134, 135, and 136 are arranged in two columns, i.e., first and second columns. However, the present disclosure is not limited thereto, and a larger number of columns may be formed in the TSP. Also, FIG. 1 illustrates that only seven Tx pads 120, 121, 122, 123, 124, 125, and 126, or 130, 131, 132, 133, 134, 135, and 136 are arranged in each column. However, the present disclosure is not limited thereto, and a larger number of Tx pads or a smaller number of Tx pads may be formed in each column.

Meanwhile, the Rx pads 110 and 115 may be connected to a touch sensing unit 170 through receiver lines (Rx lines) 140 and 145 respectively connected thereto. In addition, the Tx pads 120, 121, 122, 123, 124, 125, 126, 130, 131, 132, 133, 134, 135, and 136 may be connected to the touch sensing unit 170 through transmitter lines (Tx lines) 150 and 160 respectively connected thereto. For example, the first Rx pad 110 in the first column may be connected to the touch sensing unit 170 through a first Rx line 140. The (1-1)th Tx pad 120 in the first column may be connected to the touch sensing unit 170 through a (1-1)th Tx line, and the (1-2)th Tx pad in the first column may be connected to the touch sensing unit 170 through a (1-2)th Tx line. Also, a (2-1)th Tx pad 130 in the second column may be connected to the touch sensing unit 170 through a (2-1)th Tx line, and a (2-2)th Tx pad 131 in the second column may be connected to the touch sensing unit 170 through a (2-2)th Tx line.

In this case, a previously set voltage (e.g., an AC voltage) may be applied to the Tx pads 120, 121, 122, 123, 124, 125, 126, 130, 131, 132, 133, 134, 135, and 136 through the Tx lines 150 and 160. In addition, a mutual capacitance may be formed between each of the Tx pads 120, 121, 122, 123, 124, 125, 126, 130, 131, 132, 133, 134, 135, and 136 and the Rx pad 110 or 115 corresponding thereto. For example, a (1-1)th mutual capacitance may be formed between the first Rx pad 110 and the (1-1)th Tx pad 120, formed in the first column, and a (1-2)th mutual capacitance may be formed between the first Rx pad 110 and the (1-2)th Tx pad 121, formed in the first column. When a touch event occurs in the TSP, the mutual capacitance between the Rx pad 110 or 115 and the Tx pad 120, 121, 122, 123, 124, 125, 126, 130, 131, 132, 133, 134, 135, or 136, located in an area in which a touch is applied, may be changed. The touch sensing unit 170 may calculate a touch position by sensing a change in the mutual capacitance between the Rx pad 110 or 115 and the Tx pad 120, 121, 122, 123, 124, 125, 126, 130, 131, 132, 133, 134, 135, or 136. For example, when a touch event occurs between the first Rx pad 110 and a (1-4)th Tx pad 123, the mutual capacitance formed between the first Rx pad 110 and the (1-4)th Tx pad 123 may be changed. The touch sensing unit 170 may sense the changed mutual capacitance and calculate a touch position at which the touch event occurs between the first Rx pad 110 and the (1-4)th Tx pad 123.

According to an exemplary embodiment, the Rx pads and the Tx pads may be formed on the TSP, and the touch sensing unit 170 may be formed on a flexible printed circuit (FPC).

Figure 2:
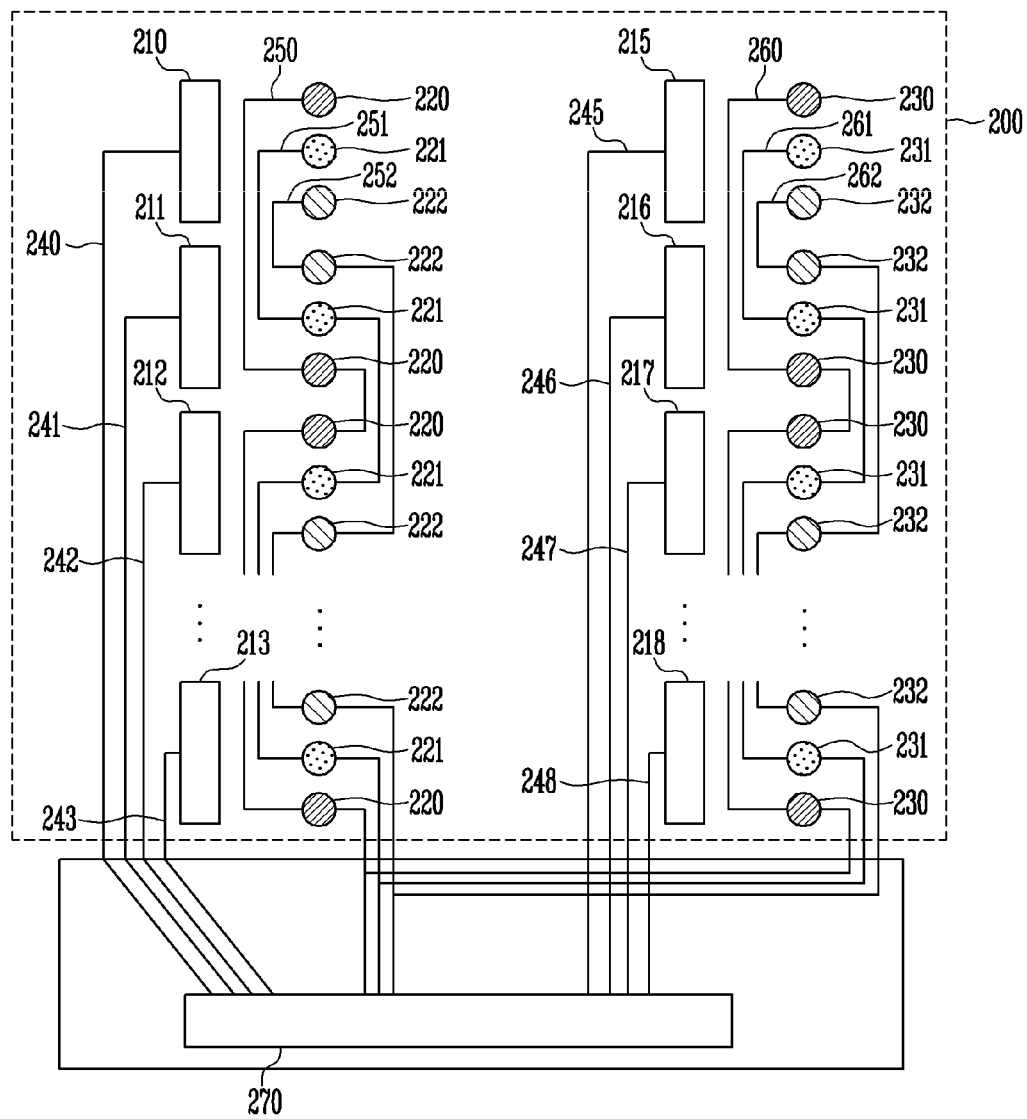
FIG. 2 is a diagram illustrating another exemplary embodiment of the configuration of the transmitter pads and the receiver pads in the touch screen panel.

FIG. 2 is a diagram illustrating another exemplary embodiment of the configuration of the transmitter pads and the receiver pads in the touch screen panel.

Referring to FIG. 2, the touch screen panel (TSP) may include a touch pad unit 200 including a plurality of receiver pads (Rx pads) 210, 211, 212, 213, 215, 216, 217, and 218 and a plurality of transmitter pads (Tx pads) 220, 221, 222, 230, 231, and 232 combined therewith. In this case, each column of the touch pad unit 200 included in the TSP may be configured in a form in which m Rx pads 210, 211, 212, and 213 or 215, 216, 217, and 218 and n Tx pads 220, 221, and 222 or 230, 231, and 232 corresponding to each Rx pad are combined.

Specifically, m (1-1)th to (1-m)th Rx pads 210, 211, 212, and 213 adjacent to each other in the column direction (y-axis direction) may be formed in a first column of the TSP. In this case, for convenience of illustration, the (1-1)th to (1-m)th Rx pads 210, 211, 212, and 213 may be referred to as first Rx pads. In addition, n (1-1)th to (1-n)th Tx pads 220, 221, and 222 adjacent to each other in the column direction (y-axis direction) may be adjacent to each of the first Rx pads 210, 211, 212, and 213 in the row direction (x-axis direction). For example, (1-1)th to (1-n)th Tx pads 220, 221, and 222 adjacent to each other in the column direction (y-axis direction) may be located adjacent to the (1-1)th Rx pad 210 in the row direction (x-axis direction). Also, (1-1)th to (1-n)th Tx pads 220, 221, and 222 may be located adjacent to the (1-2)th Rx pad 211 in the row direction (x-axis direction).

Similarly, in a second column of the TSP, 1 (2-1)th to (2-1)th Rx pads 215, 216, 217, and 218 adjacent to each other in the column direction (y-axis direction) are formed, and k (2-1)th to (2-k)th Tx pads 230, 231, 232 adjacent to each other in the column direction (y-axis direction) may be adjacent to each of the Rx pads 215, 216, 217, and 218 in the row direction (x-axis direction). For example, (2-1)th to (2-k)th Tx pads 230, 231, and 232 adjacent to each other in the column direction (y-axis direction) may be located adjacent to the (2-1)th Rx pad 215 in the row direction (x-axis direction). Also, (2-1)th to (2-k)th Tx pads 230, 231, and 232 may be located adjacent to the (2-2)th Rx pad 216 in the row direction (x-axis direction). In this case, the number m of the Rx pads 210, 211, 212, and 213 formed in the first column of the TSP may be equal to the number 1 of the Rx pads 215, 216, 217, and 218 formed in the second column of the TSP (m=1). In addition, the number n of the Tx pads 220, 221, and 222 combined with each of the first Rx pads 210, 211, 212, and 213 formed in the first column of the TSP may be equal to the number k of the Tx pads 230, 231, and 232 combined with each of the second Rx pads 215, 216, 217, and 218 formed in the second column of the TSP (n=k). Although not shown in FIG. 2, Tx pads and Rx pads may be formed similarly to the first and second columns in other columns (e.g., third to jth columns) of the TSP.

A plurality of Tx pads 220, 221, and 222 or 230, 231, and 232 combined with each of Rx pads 210, 211, 212, and 213 or 215, 216, 217, and 218 formed in one column of the TSP may be referred to as a Tx pad set. For example, a plurality of Tx pads 220, 221, and 222 combined with the (1-1)th Rx pad 210 formed in the first column of the TSP may be referred to as a (1-1)th Tx pad set. Also, a plurality of Tx pads 220, 221, and 222 combined with the (1-2)th Rx pad 211 formed in the first column of the TSP may be referred to as a (1-2)th Tx pad set.

In this case, according to an exemplary embodiment, the arrangement form of the Tx pads 220, 221, and 222 in the (1-1)th Tx pad set may be symmetric with the arrangement form of the Tx pads 220, 221, and 222 in the (1-2)th Tx pad set. For example, when assuming that a Tx pad set includes three Tx pads, a (1-1)th Tx pad 220, a (1-2)th Tx pad 221, and a (1-3)th Tx pad 222 may be arranged in the column direction (y-axis direction) in the (1-1)th Tx pad set, and a (1-3)th Tx pad 222, a (1-2)th Tx pad 221, and a (1-1)th Tx pad 220 may be arranged in the column direction (y-axis direction) in the (1-2)th Tx pad set. That is, the arrangement form of Tx pads of a Tx pad set may be symmetric with the arrangement for of Tx pads of a Tx pad set adjacent thereto in the column direction. In other words, the Tx pads 220, 221, 222, 230, 231, and 232 may be arranged opposite to each other, based on the Rx pads 210, 211, 212, 213, 215, 216, 217, and 218 combined therewith.

The Rx pads 210, 211, 212, 213, 215, 216, 217, and 218 may be connected to a touch sensing unit 270 through Rx lines 240, 241, 242, 243, 245, 246, 247, and 248 respectively connected thereto. For example, the (1-1)th Rx pad 210 may be connected to the touch sensing unit 270 through a (1-1)th Rx line 240, and the (2-1)th Rx pad 215 may be connected to the touch sensing unit 270 through a (2-1)th Rx line 245.

In addition, the Tx pads 220, 221, 222, 230, 231, and 232 may be connected to corresponding pads combined with adjacent Rx pads 210, 211, 212, 213, 215, 216, 217, and 218 through Tx lines 250, 251, 252, 260, 261, and 262, respectively. That is, the Tx pad combined with each of the Rx pads 210, 211, 212, 213, 215, 216, 217, and 218 may be connected to a corresponding Tx pad combined with an adjacent Rx pad through a Tx line. For example, the (1-1)th Tx pad 220 included in the (1-1)th Tx pad set combined with the (1-1)th Rx pad 210 may be connected to the corresponding (1-1)th Tx pad 220 included in the (1-2)th Tx pad set combined with the (1-2)th Rx pad 211 through a (1-1)th Tx line 250. Also, the (1-2)th Tx pad 221 included in the (1-2)th Tx pad set combined with the (1-2)th Rx pad 211 may be connected to the (1-2)th Tx pad 221 included in the (1-1)th Tx pad set combined with the (1-1)th Rx pad 210 through a (1-2)th Tx line 251, and connected to the (1-2)th Tx pad 221 included in a (1-3)th Tx pad combined with the (1-3)th Rx pad 212 through the (1-2)th Tx line 251. Also, the Tx pads 220, 221, and 222 or 230, 231, and 232 included in a Tx pad set combined with the Rx pad 213 or 218 most adjacent to the touch sensing unit 270 may be connected to the touch sensing unit 270 through the Tx lines 250, 251, and 252 or 260, 261, and 262.

In this case, a previously set voltage (e.g., an AC voltage) may be applied to the Tx pads 220, 221, 222, 230, 231, and 232 through the Tx lines 250, 251, and 252 or 260, 261, and 26. In addition, a mutual capacitance may be formed between each of the Tx pads 220, 221, and 222 or 230, 231, and 232 and the Rx pad 210, 211, 212, 213, 215, 216, 217, or 218 corresponding thereto. In this case, when a touch event occurs in the TSP, the mutual capacitance between the Rx pad 210, 211, 212, 213, 215, 216, 217, or 218 and the Tx pad 220, 221, 222, 230, 231, or 232, located in an area in which a touch is applied, may be changed. The touch sensing unit 270 may calculate a touch position by sensing a change in the mutual capacitance between the Rx pad 210, 211, 212, 213, 215, 216, 217, or 218 and the Tx pad 220, 221, 222, 230, 231, or 232. For example, when a touch event occurs between the (1-2)th Rx pad 211 and the (1-2)th Tx pad 221, the mutual capacitance formed between the (1-2)th Rx pad 211 and the (1-2)th Tx pad 221 may be changed. The touch sensing unit 270 may sense the changed mutual capacitance, and calculate a touch position at which the touch event occurs between the (1-2)th Rx pad 211 and the (1-2)th Tx pad 221.

According to an exemplary embodiment, the Rx pads and the Tx pads may be formed on the TSP, and the touch sensing unit 270 may be formed on an FPC.

Figure 3:
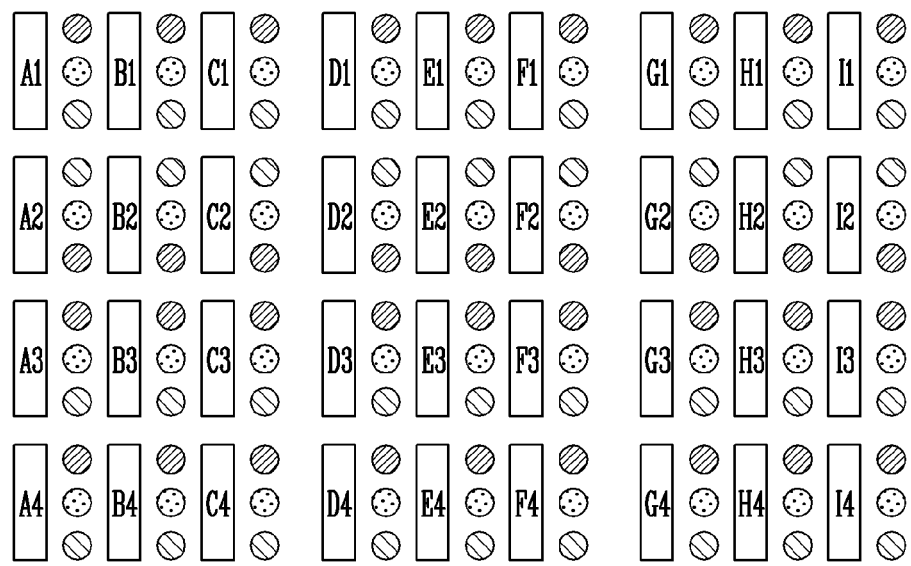
FIG. 3 is a diagram illustrating an example of an arrangement form of transmitter pads and receiver pads in the touch screen panel shown in FIG. 2.

FIG. 3 is a diagram illustrating an example of an arrangement form of transmitter pads and receiver pads in the touch screen panel shown in FIG. 2.

FIG. 3 illustrates an example in which Rx pads and Tx pads are arranged in 12 rows and 9 columns in the TSP. In this case, four Rx pads may be arranged in each column. For example, four Rx pads A1, A2, A3, and A4 may be arranged in a first column, and four Rx pads I1, I2, I3, and I4 may be arranged in a ninth column. In addition, three Tx pads combined with each of the Rx pads may be arranged. For example, three Tx pads Tx1, Tx2, and Tx3 combined with the Rx pad A1 in the first column may be arranged adjacent to the Rx pad A1 in the row direction (x-axis direction), and three Tx pads Tx1, Tx2, and Tx3 combined with the Rx pad I1 in the ninth column may be arranged adjacent to the Rx pad I1 in the row direction (x-axis direction). In FIG. 3 illustrates an example in which four Rx pads are arranged in each column, and each Rx pad is combined with three Tx pads. However, the present disclosure is not limited thereto. That is, a larger number of Tx pads or a smaller number of Tx pads may be combined with each Rx pad, and a larger number of Rx pads may be arranged in each column.

In this case, the arrangement form of Tx pads combined with a specific Rx pad may be symmetric with the arrangement form of Tx pads combined with an adjacent Rx pad in the column direction (y-axis direction). For example, the Tx pads combined with the Rx pad A1 in the first column may be arranged in the column direction in an order of Tx1, Tx2, and Tx3, and the Tx pads combined with the Rx pad A2 in the first column may be arranged in the column direction in an order of Tx3, Tx2, and Tx1.

Although not shown in FIG. 3, as described in the section related to FIG. 2, each Tx pad may be connected to a corresponding Tx pad combined with an adjacent Rx pad through a Tx line. For example, the Tx1 among the Tx pads combined with the Rx pad A1 in the first column may be connected to the Tx1 combined with the Rx pad A2 in the first column through a Tx line. Also, the Tx1 combined with the Rx pad A2 may be connected to the Tx1 combined with the Rx pad A3 through a Tx line.

Figure 4:
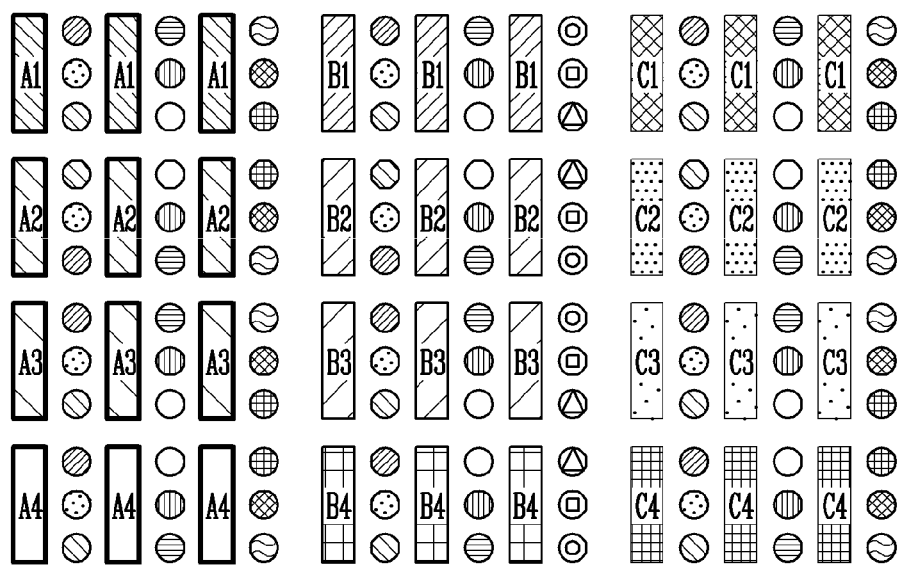
FIG. 4 is a diagram illustrating another example of the arrangement form of the transmitter pads and the receiver pads in the touch screen panel shown in FIG. 2.

FIG. 4 is a diagram illustrating another example of the arrangement form of the transmitter pads and the receiver pads in the touch screen panel shown in FIG. 2.

FIG. 4 illustrates an example in which Rx pads and Tx pads are arranged in 12 rows and 9 columns in the TSP. In this case, four Rx pads may be arranged in each column. For example, four Rx pads A1, A2, A3, and A4 may be arranged in a first column, and four Rx pads B1, B2, B3, and B4 may be arranged in a fourth column. In addition, three Tx pads combined with each of the Rx pads may be arranged. For example, three Tx pads Tx1-1, Tx1-2, and Tx1-3 combined with the Rx pad A1 in the first column may be arranged adjacent to the Rx pad A1 in the row direction (x-axis direction), and three Tx pads Tx1-1, Tx1-2, and Tx1-3 combined with the Rx pad B1 in the fourth column may be adjacent to the Rx pad B1 in the row direction (x-axis direction). FIG. 4 illustrates an example in which four Rx pads are arranged in each column, and each Rx pad is combined with three Tx pads. However, the present disclosure is not limited thereto. That is, a larger number of Tx pads or a smaller number of Tx pads may be combined with each Rx pad, and a larger number of Rx pads may be arranged in each column.

In this case, the arrangement for of Tx pads combined with a specific Rx pad may be symmetric with the arrangement form of Tx pads combined with an adjacent Rx pad in the column direction (y-axis direction). For example, the Tx pads combined with the Rx pad A1 in the first column may be arranged in the column direction in an order of Tx1-1, Tx1-2, and Tx1-3, and the Tx pads combined with the Rx pad A2 in the first column may be arranged in the column direction in an order of Tx1-3, Tx1-2, and Tx1-1.

In this exemplary embodiment, Rx pads arranged in at least two columns may be the same. For example, Rx pads A1, A2, A3, and A4 may be arranged in the first column, and Rx pads A1, A2, A3, and A4 may be identically arranged even in second and third columns. In addition, Rx pads B1, B2, B3, and B4 may be arranged in fourth to sixth columns, and Rx pads C1, C2, C3, and C4 may be arranged in seventh to ninth columns.

In this case, Rx pads arranged in each column may be referred to as an Rx pad set. For example, the Rx pads A1, A2, A3, and A4 may be referred to as a first Rx pad set (or Rx pad set A), the Rx pads B1, B2, B3, and B4 may be referred to as a second Rx pad set (or Rx pad set B), and the Rx pads C1, C2, C3, and C4 may be referred to as a third Rx pad set (or Rx pad set C). In addition, columns having the same Rx pad sets may be referred to as a group. For example, the first to third columns having the same first Rx pad set may be referred to as a first group (or group A), the fourth to sixth columns having the same second Rx pad set may be referred to as a second group (or group B), and the seventh to ninth columns having the same third Rx pad set may be referred to as a third group (or group C).

FIG. 4 illustrates an example in which Rx pads arranged in three columns are the same. However, the present disclosure is not limited thereto. For example, Rx pads arranged in two columns may be the same, and Rx pads arranged in four or more columns may be the same.

In this case, in adjacent columns having the same Rx pad set, Tx pads combined with the same Rx pad may be different from each other. For example, the Tx pads combined with the Rx pad A1 in the first column may be Tx1-1, Tx1-2, and Tx1-3, the Tx pads combined with the Rx pad A1 in the second column may be Tx2-1, Tx2-2, and Tx2-3, and the Tx pads combined with the Rx pad A1 in the third column may be Tx3-1, Tx3-2, and Tx3-3. That is, Tx pads arranged for each column in the same group may be different from each other.

According to an exemplary embodiment, Tx pads arranged for each column in each group may be the same in all groups. For example, the Tx pads combined with the first Rx pad set in the first column belonging to the first group may be Tx1-1, Tx1-2, and Tx1-3. Also, the Tx pads combined with the second Rx pad in the fourth column belonging to the second group may also be Tx1-1, Tx1-2, and Tx1-3. When the Tx pads combined with the first Rx pad in the second column belonging to the first group are Tx2-1, Tx2-2, and Tx2-3, the Tx pads combined with the second Rx pad set in the fifth column belonging to the second group may also be Tx2-1, Tx2-2, and Tx2-3. When the Tx pads combined with the first Rx pad in the third column belonging to the first group are Tx3-1, Tx3-2, and Tx3-3, the Tx pads combined with the second Rx pad set in the sixth column belonging to the second group may also be Tx3-1, Tx3-2, and Tx3-3. Similarly, the Tx pads combined with the third Rx pad set in the seventh column belonging to the third group may be Tx1-1, Tx1-2, and Tx1-3, the Tx pads combined with the third Rx pad set in the eighth column belonging to the third group may be Tx2-1, Tx2-2, and Tx2-3, and the Tx pads combined with the third Rx pad set in the ninth column belonging to the third group may be Tx3-1, Tx3-2, and Tx3-3.

According to an exemplary embodiment, Tx pads arranged in at least one column belonging to at least one group may be different from Tx pads arranged in the other groups. For example, the Tx pads arranged in the first and third groups may be Tx1-1, Tx1-2, and Tx1-3 in the first and seventh columns, Tx2-1, Tx2-2, and Tx2-3 in the second and eighth columns, and Tx3-1, Tx3-2, and Tx3-3 in the third and ninth columns. However, in the Tx pads arranged in the second group, Tx1-1, Tx1-2, and Tx1-3 are arranged in the fifth column, and Tx2-1, Tx2-2, and Tx2-3 are arranged in the fourth column. However, Tx4-1, Tx4-2, and Tx4-3 may be arranged in the fifth column. Therefore, the Tx pads arranged in the second group may be different from the Tx pads arranged in each column of the first and third groups.

In the above, the touch screen panel and the arrangement forms of the Tx pads and Rx pads included therein according to the exemplary embodiments of the present disclosure have been described.

However, in the touch screen panel, a touch reaction may be generated by coupling between Rx pads within a touch position and lines of Tx pads corresponding thereto. That is, a position other than an actual touch position may be erroneously recognized as the touch position, and therefore, the accuracy in recognition of a touch position may be reduced as a result of a ghost phenomenon.

Figure 5:
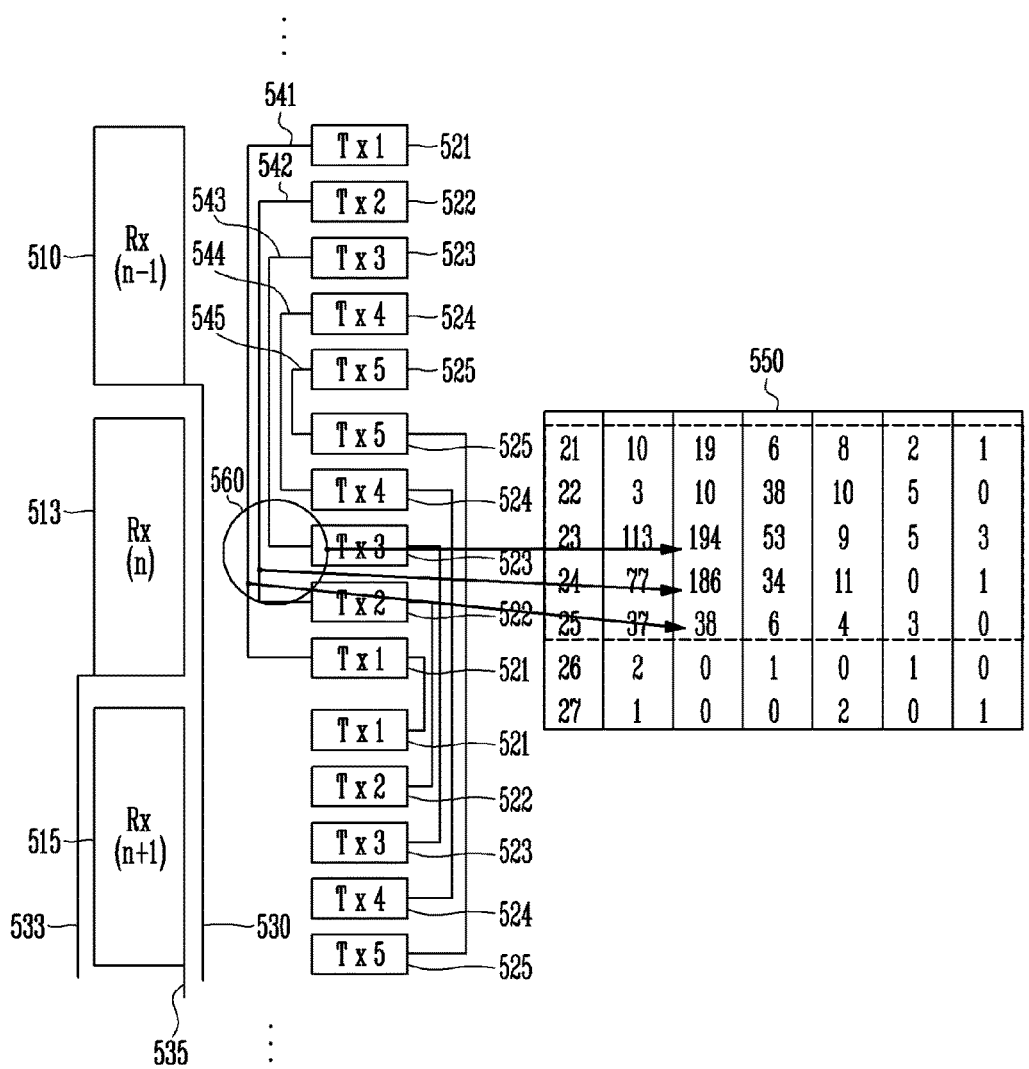
FIG. 5 is a diagram illustrating an example of a touch sensing signal corresponding to a touch event when the touch event occurs in a touch screen panel according to an exemplary embodiment of the present disclosure.

FIG. 5 is a diagram illustrating an example of a touch sensing signal corresponding to a touch event when the touch event occurs in a touch screen panel according to an exemplary embodiment of the present disclosure.

FIG. 5 illustrates one column in which Rx pads 510, 513, and 515, Tx pads 521, 522, 523, 524, and 525, Rx lines 530, 533, and 535, and Tx lines 541, 542, 543, 544, and 545 are arranged in the TSP according to an exemplary embodiment of the present disclosure.

In this case, a plurality of Rx pads adjacent to each other in the column direction (y-axis direction) may be arranged. In FIG. 5, three Rx pads, i.e., a first Rx pad (Rx(n−1)) 510, a second Rx pad (Rx(n)) 513, and a third Rx pad (Rx(n+1)) are illustrated. However, this is for convenience of illustration, and a larger number of Rx pads may be arranged. The Rx pads 510, 513, and 515 may be respectively connected to the Rx lines 530, 533, and 535 corresponding thereto, to be connected to a touch sensing unit (not shown).

In addition, a Tx pad set each including a plurality of Tx pads 521, 522, 523, 524, and 525 adjacent to each other in the column direction (y-axis direction) may be arranged adjacent to each of the Rx pads 510, 513, and 515 in the row direction (x-axis direction). For example, five Tx pads, i.e., a first Tx pad 521, a second Tx pad 522, a third Tx pad 523, a fourth Tx pad 524, and a fifth Tx pad 525 are arranged adjacent to each other in the column direction (y-axis direction), and may be referred to as a Tx pad set. The Tx pad set may be arranged adjacent to the first Rx pad 510 in the row direction. Also, the Tx pad set may be arranged adjacent to the second Rx pad 513 and the third Rx pad 515 in the row direction. Here, for convenience of illustration, the Tx pad set combined with the first Rx pad 510 will be referred to as a first Tx pad set, the Tx pad set combined with the second Rx pad 513 will be referred to as a second Tx pad set, and the Tx pad set combined with the third Rx pad 515 will be referred to as a third Tx pad set.

In this case, arrangement forms of Tx pads of Tx pad sets adjacent to each other in the column direction may be symmetric with each other. For example, the arrangement form of the Tx pads of the first Tx pad set combined with the first Rx pad 510 may be arranged from top to bottom in an order of the first Tx pad 521, the second Tx pad 522, the third Tx pad 523, the fourth Tx pad 524, and the fifth Tx pad 525. Also, the arrangement form of the Tx pads of the second Tx pad set combined with the second Rx pad 513, which is adjacent to the first Tx pad set in the column direction, may be arranged from top to bottom in an order of the fifth Tx pad 525, the fourth Tx pad 524, the third Tx pad 523, the second Tx pad 522, and the first Tx pad 521. Also, the arrangement form of the Tx pads of the third Tx pad set combined with the third Rx pad 515, which is adjacent to the second Tx pad set in the column direction, may be arranged from top to bottom in an order of the first Tx pad 521, the second Tx pad 522, the third Tx pad 523, the fourth Tx pad 524, and the fifth Tx pad 525.

The Tx pads included in the Tx pad set may be connected to corresponding Tx pads included in a Tx pad adjacent thereto in the column direction through the Tx lines 541, 542, 543, 544, and 545, respectively. For example, the first Tx pad included in the first Tx pad set may be connected to the first Tx pad included in the second Tx pad set through a first Tx line 541. The first Tx pad included in the second Tx pad set may be connected to the first Tx pad included in the third Tx pad set through the first Tx line 541. Similarly, the second Tx pad included in the first Tx pad set may be connected to the second Tx pad included in the second Tx pad set through a second Tx line 542. The second Tx pad included in the second Tx pad set may be connected to the second Tx pad included in the third Tx pad set through the second Tx line 542.

In this state, as shown in 560 of FIG. 5, a touch even may occur between the second Rx pad (Rx(n)) 513 and the third Tx pad (Tx 3) 523. In this case, a mutual capacitance between the second Rx pad 513 and the third Tx pad 523 may be changed, and an amount of the change in mutual capacitance may be applied as a touch signal to the touch sensing unit (not shown).

550 of FIG. 5 is a view illustrating an example of an amount of a change in mutual capacitance between Rx pads and Tx pads, which is sensed by the touch sensing unit (not shown). That is, 550 illustrates an example of the magnitude of a touch sensing signal when a touch event occurs. Here, 21 to 27 of the leftmost column represent column numbers of Tx pads. Also, numerals shown in second to sixth columns represent amounts of changes in mutual capacitance for each column in the TSP. For example, values of changes in mutual capacitance between the Rx pads 510, 513, and 515 and the Tx pads 521 to 525, shown in FIG. 5, may be numerals shown in the third column of 550. Also, numerals shown in the second column of 550 may represent values of changes in mutual capacitance, caused by Tx pads (not shown) arranged in the left column of the Rx pads 510, 513, and 515 shown in FIG. 5.

Referring to 550, when a touch event occurs between the second Rx pad 513 and the third Tx pad 523 of FIG. 5 (560), the value of a change in mutual capacitance between the second Rx pad 513 and the third Tx pad 523 may be 194. Also, the value of a change in mutual capacitance between the second Rx pad 513 and the fifth Tx pad 525 may be 19, and the value of a change in mutual capacitance between the second Rx pad 513 and the fourth Tx pad 524 may be 10. Also, the value of a change in mutual capacitance between the second Rx pad 513 and the second Tx pad 522 may be 186, and the value of a change in mutual capacitance between the second Rx pad 513 and the first Tx pad 521 may be 38.

In this case, an actual touch area 560 has occurred between the second Rx pad 513 and the third Tx pad 523, and hence an actual touch signal is to be the value of the change in mutual capacitance between the second Rx pad 513 and the third Tx pad 523. However, a touch reaction may be generated by coupling between the second Rx pad 513 and the first Tx line 541, between the second Rx pad 513 and the second Tx line 542, or between the second Rx pad 513 and the third Tx line 543. In this case, it may be understood that the touch event has occurred between the second Rx pad 513 and the second Tx pad 522 as a result of the coupling between the second Rx pad 513 and the second Tx line 542 coming up from the lower end of the third Tx pad 523. Also, it may be understood that the touch event has occurred between the second Rx pad 513 and the first Tx pad 521 as a result of the coupling between the second Rx pad and the first Tx line 541. That is, a value of a change in mutual capacitance is sensed as if a touch event occurred between the second Tx pad 522 and the first Tx pad 521 except the actual touch area 560, and therefore, a ghost may occur.

The ghost occurs near the touch area 560 in which an actual touch is applied. Therefore, the ghost may become a factor that obstructs the detection of the position of an actual touch signal.

Figure 6:
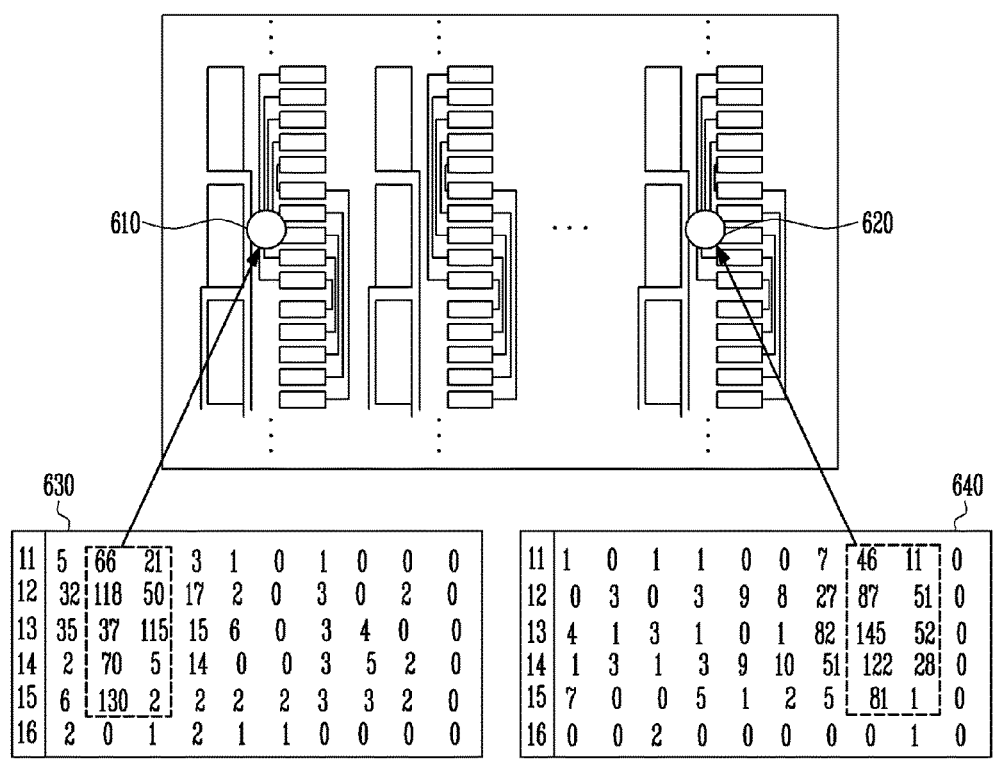
FIG. 6 is a diagram illustrating an example of a touch sensing signal corresponding to a touch event in each column when the touch event occurs in a touch screen panel according to an exemplary embodiment of the present disclosure.

FIG. 6 is a diagram illustrating an example of a touch sensing signal corresponding to a touch event in each column when the touch event occurs in a touch screen panel according to an exemplary embodiment of the present disclosure.

Referring to FIG. 6, a plurality of Rx pads and a plurality of Tx pads may be arranged in a plurality of columns in the TSP. In this state, when a touch event occurs in a first touch area 610, amounts of changes in mutual capacitance between Rx pads and Tx pads, sensed by a touch sensing unit (not shown), may be shown in 630. In addition, when a touch event occurs in a second touch area 620, amounts of changes in mutual capacitance between Rx pads and Tx pads, sensed by a touch sensing unit (not shown), may be shown in 640.

In this case, if magnitudes of touch signals at all touch positions, i.e., amounts of changes in mutual capacitance at an actual touch position are greater than the magnitude of a ghost signal caused by coupling between a Rx pad and a Tx line, the other signals except a position having the greatest signal value may be considered as ghost signals to be removed. However, although a touch is applied at a position of the same electrode structure, there may occur a case where the magnitude of a touch signal is greater than the magnitude of a ghost signal due to a difference in characteristic between electrodes and/or a difference in characteristic between touch ICs according to a position of the TSP.

For example, when a touch event occurs in the touch area 620, the magnitude of a touch sensing signal in the corresponding area may be 145 as shown in 640, which is greatest. Meanwhile, since Rx pads actually exist at both the left and right sides of a Tx pad in the row direction, a touch sensing signal represented as 52 in the right column of the Tx pad may also be recognized at an actual touch signal, in addition to the touch signal represented as 145. In this case, if a touch event occurs in the area 620, the maximum value of a touch sensing signal is shown at the same position (i.e., the same row) for each column.

On the other hand, when a touch event occurs in the touch area 610, positions at which maximum values of touch sensing signals are shown for every column may be different as shown in 630. It can be seen that the maximum value in a first column of an area indicated by a dotted line in 630 is 130 shown in the last row, and the maximum value in a second column of the area is 115 shown in a third row. In this case, when a touch event occurs in the area 610, maximum values of the touch sensing signal are shown at different positions (i.e., different rows) in columns, and therefore, it is difficult to distinguish the touch signal from the ghost signal.

FIG. 7 is a diagram illustrating an example of a touch sensing signal corresponding to a touch event according to an embodiment of the present disclosure.

As described above, a plurality of Tx pads may be combined with one Rx pad. For convenience of illustration, it is assumed that five Tx pads are combined with one Rx pad.

In this case, it is assumed that a touch event occurs in a third Tx pad combined with a first Rx pad. In this state, a ghost signal between the first Rx pad and a Tx line may be detected among values of five touch sensing signals reacting with the same first Rx pad. However, Rx pads actually exist at both the left and right sides of a Tx pad, and therefore, the actual range of touch sensing signals may be 10 (5×2=10). That is, an actual touch signal and a ghost signal may exist in the range of a total of 10 touch sensing signals reacting with Rx pads at both the left and right sides of the Tx pad in which the touch event occurs. Referring to FIG. 7, an actual touch signal and a ghost signal may exist among values of 10 touch sensing signals in an area indicated by a dotted line. For convenience of illustration, the area in which the actual touch signal and the ghost signal may exist as described above will be referred to as a touch coordinate search area.

In this case, a touch sensing unit may search a maximum value by scanning signals in the column direction (i.e., the direction from the bottom end to the top end of the TSP).

As a result obtained by determining positions of maximum signal values for every column, when the positions of the maximum signal values for every column are the same, i.e., when rows in which the maximum signal values are shown for every column are the same, the touch sensing unit may recognize touch coordinates through a combination of Tx pads and Rx pads in the corresponding row.

In addition, when the positions of the maximum signal values are not the same for every column, the touch sensing unit may determine a position at which the greatest value exist as the position of a Tx pad, at which an actual touch occurs, by comparing all values of touch sensing signals in the touch coordinate search area.

For example, as shown in FIG. 7, the touch sensing unit may scan values of touch sensing signals in the direction from the bottom end to the top end of the TSP in second and third columns. In this case, the maximum value of touch sensing signals in the second column may be sensed as 130 in a fifth row (corresponding to 15), and the maximum value of touch sensing signals in the third column may be sensed as 115 in a third row (corresponding to 13).

Because the positions of rows in which the maximum values of the touch sensing signals in the second and third column are different from each other, as described above, the touch sensing unit may determine a position at which the greatest value exist by comparing all value of touch sensing signals in the area shown by the dotted line, which is the touch coordinate search area. That is, the fifth row of the second column may be determined as the position at which the maximum value of the touch sensing signals exists. In addition, the fifth row of the second column may be determined as the position of the Tx pad in the area in which the actual touch occurs.

In the case of an actual touch signal, the actual touch signal corresponds to the amount of a change in mutual capacitance between an Rx pad and any one Tx pad among Tx pads combined with the Rx pad. However, in the case of a ghost signal, the ghost signal corresponds to the amount of a change in mutual capacitance between an Rx pad and a Tx line, which is independent from the actual touch signal. That is, the magnitude of the actual touch signal results from the change in mutual capacitance between the Rx pad and the Tx pad, which may be distinguished from the magnitude of the ghost signal resulting from the change in mutual capacitance between the Rx pad and the Tx line. Therefore, the magnitude of the actual touch signal is greater than the magnitude of the ghost signal. Hence, when the positions of the maximum signal values for every column are not the same, the touch sensing unit may determine the position at which the greatest value exists as the position of the Tx pad in the area in which the actual touch occurs.

FIG. 8 is a flowchart illustrating an example of a method for determining a touch position according to an exemplary embodiment of the present disclosure.

Referring to FIG. 8, in step 810, a touch sensing unit according to the present disclosure may search maximum signal values for every column by scanning touch sensing signals in the column direction.

In step 820, the touch sensing unit may decide whether positions at which the maximum signal values exist for every column are the same. That is, the touch sensing unit may determine whether rows having the maximum signal values for every column are the same.

When the positions of the maximum signal values for every column are the same as the decision result in step 820, in step 830, the touch sensing unit may determine touch coordinates through a combination of the same Rx and Tx pads. That is, the touch sensing unit may recognize touch coordinates through a combination of Tx and Rx pads corresponding to the row in which the maximum value of the touch sensing signals exist.

When the positions of the maximum signal values for every column are not the same as the decision result in step 820, in step 840, the touch sensing unit may determine touch coordinates through a combination of Rx and Tx pads at the position at which the greatest value exists by comparing all values in a touch sensing area.

That is, the touch sensing unit according to an exemplary embodiment of the present disclosure may apply a previously set voltage to Tx pads by receiving a control signal from a signal controller. Also, the touch sensing unit may decide whether a touch event has occurred by receiving, as a touch sensing signal, an amount of a change in mutual capacitance between a Tx pad and an Rx pad corresponding thereto.

In this case, the touch sensing unit according to an exemplary embodiment of the present disclosure may search maximum signal values for every column by scanning touch sensing signals in the column direction of the TSP. Also, the touch sensing unit may decide whether the positions of the maximum signal values for every column are the same. That is, the touch sensing unit may decide whether rows having the maximum signal values for every column in the touch sensing area are the same. After that, when the positions of the maximum signal values for every column are the same, the touch sensing unit may determine touch coordinates through a combination of the same Rx and Tx pads. That is, the touch sensing unit may recognize touch coordinates through a combination of Tx and Rx pads corresponding to the row in which the maximum value of the touch sensing signals exist. When the positions of the maximum signal values for every column are not the same, the touch sensing unit may determine touch coordinates through a combination of Rx and Tx pads at the position at which the greatest value exists by comparing all values in a touch sensing area.

According to exemplary embodiments, is possible to provide a method and a device for accurately sensing a touch position.

According to exemplary embodiments, it is possible to provide a method and a device for sensing an actual touch position by distinguishing the actual touch position from a ghost signal in a touch panel having a 1-layer mutual structure.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A touch screen panel, comprising:
   a plurality of receiver pads arranged in a plurality of columns adjacent to each other in a column direction and comprising a first receiver pad;
   a plurality of transmitter pad sets arranged adjacent to the corresponding receiver pads in a row direction and comprising a first transmitter pad set and a second transmitter pad set, each transmitter pad set comprising a plurality of transmitter pads adjacent to each other in the column direction such that the number of transmitter pads is greater than the number of receiver pads; and
   a touch sensing unit configured to determine a touch position corresponding to the first receiver pad based on changes in first mutual capacitances between the first receiver pad and the first transmitter pad set and second mutual capacitances between the first receiver pad and the second transmitter pad set,
   wherein:
   among the plurality of transmitter pad sets, the first transmitter pad set is the most adjacent to the first receiver pad in the row direction;
   among the plurality of transmitter pad sets, the second transmitter pad set is the most adjacent to the first receiver pad in an opposite direction to the row direction; and
   the touch sensing unit is configured to:
      determine a first maximum value of the changes in the first mutual capacitances and a second maximum value of the changes in the second mutual capacitances;
      decide whether the first maximum value and the second maximum value are the same;
      determine the touch position corresponding to the first maximum value and the second maximum value when the first maximum value and the second maximum value are the same;
      determine a greatest value among the first maximum value and the second maximum value when the first maximum value and the second maximum value are not the same; and
      determine the touch position corresponding to the greatest value.

2. The touch screen panel of claim 1, further comprising:
   a plurality of receiver lines configured to connect the respective receiver pads to the touch sensing unit; and
   a plurality of transmitter lines configured to connect the respective transmitter pads to the touch sensing unit.

3. The touch screen panel of claim 1, wherein the transmitter pad sets respectively combined with the receiver pads in the same column are the same as each other.

4. The touch screen panel of claim 3, wherein transmitter pad sets combined with receiver pads in an adjacent column are different from each other.

5. The touch screen panel of claim 2, wherein a transmitter pad of one transmitter pad set is connected to a corresponding transmitter pad of an adjacent transmitter pad set through a transmitter line.

6. A method of driving a touch screen panel, the touch screen panel comprising:
   a plurality of receiver pads arranged in a plurality of columns adjacent to each other in a column direction and comprising a first receiver pad;
   a plurality of transmitter pad sets arranged adjacent to the corresponding receiver pads in a row direction and comprising a first transmitter pad set and a second transmitter pad set, each transmitter pad set comprising a plurality of transmitter pads adjacent to each other in the column direction such that a number of transmitter pads is greater than a number of receiver pads; and
   a touch sensing unit configured to determine a touch position corresponding to the first receiver pad based on changes in first mutual capacitances between the first receiver pad and the first transmitter pad set and second mutual capacitances between the first receiver pad and the second transmitter pad set, wherein:

among the plurality of transmitter pad sets, the first transmitter pad set is the most adjacent to the first receiver pad in the row direction;

among the plurality of transmitter pad sets, the second transmitter pad set is the most adjacent to the first receiver pad in an opposite direction to the row direction; and the method comprises:

determining a first maximum value of the changes in the first mutual capacitances and a second maximum value of the changes in the second mutual capacitances;

deciding whether the first maximum value and the second maximum value are the same;

determining the touch position corresponding to the first maximum value and the second maximum value when the first maximum value and the second maximum value are the same;

determining a greatest value among the first maximum value and the second maximum value when the first maximum value and the second maximum value are not the same; and determining the touch position corresponding to the greatest value.

\* \* \* \* \*